(12) United States Patent
Wang et al.

(10) Patent No.: US 8,363,596 B2
(45) Date of Patent: Jan. 29, 2013

(54) POWER SAVING VIA VARIABLE LISTEN INTERVALS IN A WLAN

(75) Inventors: James Wang, Richmond Hill (CA); Tom Nagy, Waterloo (CA)

(73) Assignee: Research In Motion Limited, Waterloo, Ontario (CA)

(*) Notice: Subject to any disclaimer, the term of this patent is extended or adjusted under 35 U.S.C. 154(b) by 0 days.

(21) Appl. No.: 12/538,130

(22) Filed: Aug. 8, 2009

(65) Prior Publication Data

US 2009/0296618 A1 Dec. 3, 2009

Related U.S. Application Data

(63) Continuation of application No. 11/041,113, filed on Jan. 21, 2005, now Pat. No. 7,593,417.

(51) Int. Cl.
*H04Q 7/00* (2006.01)

(52) U.S. Cl. ........ 370/328; 370/311; 370/392; 370/342; 370/390; 370/412; 370/338; 370/318; 370/254; 455/522; 455/41.2; 455/69; 455/127.1; 455/13.3; 455/574

(58) Field of Classification Search .................. 370/413, 370/328, 277, 496, 337, 248, 474, 329, 331, 370/352, 343, 311, 252, 389, 310, 254, 338, 370/401; 455/161.1, 574, 420, 450, 426, 455/432.2, 562.1; 715/751, 737, 273; 713/300, 713/320, 322; 709/229, 217, 220, 224

See application file for complete search history.

(56) References Cited

U.S. PATENT DOCUMENTS

| | | | | |
|---|---|---|---|---|
| 4,707,832 A | * | 11/1987 | Glenn et al. | 370/489 |
| 5,991,287 A | * | 11/1999 | Diepstraten et al. | 370/338 |
| 6,067,297 A | | 5/2000 | Beach et al. | |
| 6,125,369 A | | 9/2000 | Wu et al. | |
| 6,192,230 B1 | * | 2/2001 | van Bokhorst et al. | 455/343.3 |
| 6,370,121 B1 | * | 4/2002 | Hausman | 370/256 |
| 6,438,117 B1 | * | 8/2002 | Grilli et al. | 370/331 |
| 6,507,349 B1 | | 1/2003 | Balassanian | |
| 6,574,708 B2 | | 6/2003 | Hayter et al. | |
| 6,633,924 B1 | | 10/2003 | Wu et al. | |
| 6,674,738 B1 | * | 1/2004 | Yildiz et al. | 370/338 |
| 6,697,415 B1 | * | 2/2004 | Mahany | 375/130 |

(Continued)

FOREIGN PATENT DOCUMENTS

| EP | 0615364 | 9/1994 |
|---|---|---|
| EP | 0907262 | 4/1999 |

(Continued)

OTHER PUBLICATIONS

Huan Chen and Cheng-Wei Huang, (2004), Department of Electrical Engineering, Power Management Modeling and Optimal Policy for IEEE 802.11 WLAN Systems, pp. 4416-4421.*

(Continued)

*Primary Examiner* — Joseph Arevalo
(74) *Attorney, Agent, or Firm* — Integral Intellectual Property Inc.; Miriam Paton (57) ABSTRACT

A wireless client device is associated with an access point in an association having a value for a listen interval parameter. The wireless client device determines, according to pre-defined considerations, a different value for the listen interval parameter, and declares the different value for the listen interval parameter in a wireless transmission to the access point. The listen interval parameter specifies a number of beacon intervals that can pass from a time the wireless client device listens for a beacon frame from the access point before the wireless client device listens for a next beacon frame from the access point.

13 Claims, 4 Drawing Sheets

U.S. PATENT DOCUMENTS

| | | | | |
|---|---|---|---|---|
| 6,795,409 | B1* | 9/2004 | Youssefmir et al. | 370/328 |
| 6,842,460 | B1* | 1/2005 | Olkkonen et al. | 370/465 |
| 6,856,603 | B1* | 2/2005 | Vollmer et al. | 370/311 |
| 6,917,804 | B2* | 7/2005 | Takayama et al. | 455/432.1 |
| 6,928,559 | B1* | 8/2005 | Beard | 713/300 |
| 6,934,870 | B1* | 8/2005 | Amos | 713/501 |
| 6,952,181 | B2* | 10/2005 | Karr et al. | 342/457 |
| 6,982,968 | B1* | 1/2006 | Barratt et al. | 370/328 |
| 6,999,769 | B1 | 2/2006 | Henon | |
| 7,043,259 | B1* | 5/2006 | Trott | 455/458 |
| 7,062,294 | B1* | 6/2006 | Rogard et al. | 455/562.1 |
| 7,120,138 | B2* | 10/2006 | Soomro et al. | 370/343 |
| 7,123,253 | B2 | 10/2006 | Stoll et al. | |
| 7,126,926 | B1* | 10/2006 | Bjorklund et al. | 370/328 |
| 7,126,945 | B2 | 10/2006 | Beach | |
| 7,142,535 | B2* | 11/2006 | Kubler et al. | 370/353 |
| 7,167,713 | B2* | 1/2007 | Anderson | 455/456.1 |
| 7,181,190 | B2* | 2/2007 | Abhishek et al. | 455/343.4 |
| 7,206,594 | B2* | 4/2007 | Shostak | 455/519 |
| 7,212,832 | B2* | 5/2007 | Yokota | 455/513 |
| 7,224,970 | B2* | 5/2007 | Smith et al. | 455/434 |
| 7,236,470 | B1 | 6/2007 | Bims | |
| 7,236,787 | B1* | 6/2007 | Tamura et al. | 455/437 |
| 7,274,929 | B1 | 9/2007 | Banginwar | |
| 7,340,615 | B2* | 3/2008 | Krantz et al. | 713/300 |
| 7,359,738 | B2 | 4/2008 | Daniels et al. | |
| 7,382,757 | B2* | 6/2008 | LoGalbo et al. | 370/338 |
| 7,420,942 | B2 | 9/2008 | Wang | |
| 7,433,669 | B2* | 10/2008 | Rue | 455/343.2 |
| 7,447,184 | B1* | 11/2008 | Kharvandikar et al. | 370/338 |
| 7,564,826 | B2* | 7/2009 | Sherman et al. | 370/338 |
| 7,610,495 | B2* | 10/2009 | Azadet et al. | 713/300 |
| 7,676,585 | B1* | 3/2010 | Francke et al. | 709/229 |
| 7,697,464 | B2* | 4/2010 | Wakamatsu | 370/311 |
| 2002/0025810 | A1* | 2/2002 | Takayama et al. | 455/432 |
| 2002/0063472 | A1 | 5/2002 | Irvin | |
| 2003/0157951 | A1 | 8/2003 | Hasty, Jr. | |
| 2003/0174645 | A1 | 9/2003 | Paratainen et al. | |
| 2003/0217168 | A1 | 11/2003 | Adachi et al. | |
| 2003/0224840 | A1 | 12/2003 | Frank et al. | |
| 2004/0013128 | A1 | 1/2004 | Moreton et al. | |
| 2004/0072559 | A1 | 4/2004 | Kakumaru et al. | |
| 2004/0103278 | A1* | 5/2004 | Abhishek et al. | 713/160 |
| 2004/0103282 | A1 | 5/2004 | Meier et al. | |
| 2004/0125820 | A1 | 7/2004 | Rios | |
| 2004/0151149 | A1 | 8/2004 | Song et al. | |
| 2004/0153676 | A1* | 8/2004 | Krantz et al. | 713/300 |
| 2004/0192325 | A1* | 9/2004 | Backes et al. | 455/453 |
| 2004/0233936 | A1* | 11/2004 | Cheng | 370/509 |
| 2004/0235568 | A1 | 11/2004 | Kim | |
| 2004/0242258 | A1 | 12/2004 | Kim | |
| 2004/0245486 | A1* | 12/2004 | Kuranishi | 250/591 |
| 2005/0002395 | A1 | 1/2005 | Kondo | |
| 2005/0009512 | A1* | 1/2005 | Rue | 455/420 |
| 2005/0020209 | A1 | 1/2005 | Camp, Jr. | |
| 2005/0122936 | A1* | 6/2005 | Son et al. | 370/331 |
| 2005/0124294 | A1 | 6/2005 | Wentink | |
| 2005/0128988 | A1 | 6/2005 | Simpson et al. | |
| 2005/0147073 | A1 | 7/2005 | Hietalahti et al. | |
| 2005/0201341 | A1 | 9/2005 | Griswold | |
| 2005/0207400 | A1* | 9/2005 | Shinohara | 370/352 |
| 2005/0226204 | A1* | 10/2005 | Uehara | 370/349 |
| 2005/0243737 | A1 | 11/2005 | Dooley et al. | |
| 2005/0255892 | A1 | 11/2005 | Wong et al. | |
| 2005/0276237 | A1 | 12/2005 | Segal et al. | |
| 2006/0056426 | A1* | 3/2006 | Wakameda et al. | 370/401 |
| 2006/0057964 | A1* | 3/2006 | Roy et al. | 455/67.11 |
| 2006/0098647 | A1* | 5/2006 | Muehl et al. | 370/389 |
| 2006/0126533 | A1* | 6/2006 | Wang | 370/254 |
| 2006/0142004 | A1 | 6/2006 | He et al. | |
| 2006/0165073 | A1* | 7/2006 | Gopinath et al. | 370/389 |
| 2006/0174205 | A1* | 8/2006 | Jung et al. | 715/751 |
| 2006/0174206 | A1* | 8/2006 | Jung et al. | 715/751 |
| 2006/0187864 | A1* | 8/2006 | Wang et al. | 370/311 |

FOREIGN PATENT DOCUMENTS

| | | |
|---|---|---|
| EP | 1206070 | 5/2002 |
| EP | 1237334 | 9/2002 |
| EP | 1311086 | 5/2003 |
| EP | 1564930 | 8/2005 |
| EP | 1670179 | 11/2007 |

OTHER PUBLICATIONS

First Examination Report for EP 05108981.1, Nov. 25, 2005.
"Wireless LAN Medium Access Control (MAC) and Physical Layer (PHY) specifications: Higher-Speed Physical Layer Extension in the 2.4 GHz Band", IEEE Std 802.11b-1999, Jan. 20, 2000.
Arevalo, Joseph, First Office Action for U.S. Appl. No. 11/041,124; Jul. 20, 2007.
Arevalo, Joseph, Second Office Action for U.S. Appl. No. 11/041,124; Mar. 25, 2008.
Arevalo, Joseph, Third Office Action for U.S. Appl. No. 11/041,124; Aug. 4, 2008.
Arevalo, Joseph, Final Office Action for U.S. Appl. No. 11/041,124, Jan. 7, 2009.
Arevalo, Joseph, First Office Action for U.S. Appl. No. 11/041,124, May 14, 2009.
Arevalo, Joseph, First Office Action for U.S. Appl. No. 11/041,113, Jul. 26, 2007.
Arevalo, Joseph, Final Office Action for U.S. Appl. No. 11/041,113, Mar. 5, 2008.
Arevalo, Joseph, Advisory Action for U.S. Appl. No. 11/041,113, May 21, 2008.
Arevalo, Joseph, Second Office Action for U.S. Appl. No. 11/041,113, Jul. 11, 2008.
Arevalo, Joseph, Final Office Action for U.S. Appl. No. 11/041,113, Feb. 2, 2009.
Arevalo, Joseph, Notice of Allowance for U.S. Appl. No. 11/041,113, May 13, 2009.
Choi, Nakjung et al., "Unicast-Friendly Multicast in IEEE 802.11 Wireless LANs," IEEE CCNC 2006, Las Vegas, USA, Jan. 2006.
El-Hoiydi, A. et al., "Low power MAC Protocols for infrastructure Wireless sensor networks", abstract ; FIG. 3 col. 2, paragraphs 2-3, col. 5, paragraphs 1-2, col. 6 paragraph 7, col. 9 paragraph 1, Feb. 24, 2004.
Santande, Mohammadian, "EPO Partial Search Report for EP05100368", Jun. 2, 2005.
ESTI, "Broadband Radio Access Networks (BRAN); Hiperlan Type 2; Data Link Control (DLC) Layer; Part 1: Basic Data Transport Functions", ESTI TS 101 761-1 V1.3.1, Dec. 2001.
Isopescu, C, Exam Report for EP 04106427, Aug. 28, 2006.
Isopescu, C, Extended European Search Report for EP 04106427, May 25, 2005.
Jung, Eun-Sun et al., "An Energy Efficient MAC Protocol for Wireless LAN", 2002.
Matar, G., First Office Action for CA 2528376, Jun. 18, 2008.
Mian, Ali, First Office Action for CA 2531384, Jun. 13, 2008.
Muller, N, Examination Report for EP 05108981.1, Aug. 25, 2006.
Rosken, Wilfried, Examination Report for EP 05100367.1, Oct. 4, 2006.
Rosken, Wilfried, Examination Report for EP 07124188.9, Nov. 26, 2008.
Rosken, Wilfried, Extended European Search Report for EP 05100367.1, Jul. 5, 2005.
Rosken, Wilfried, Extended European Search Report for EP07124188.9, Feb. 19, 2008.
Santande, Mohammadian, Second Examination Report for EP 05108981.1, Apr. 4, 2006.
Santande, Mohammadian, Extended European Search Report for EP 05100368.9, Aug. 22, 2005.
Santande, Mohammadian, "Search Report", European Search Report for EP 05108981.1, Nov. 4, 2005.
Sefcheck, Gregory B., Notice of Allowance for U.S. Appl. No. 11/008,023, May 7, 2008.
Sefcheck, Gregory B., First Office Action for U.S. Appl. No. 11/008,023, Sep. 14, 2007.
Yanxin, Li, First Office Action for CN 2005100229007, Jul. 20, 2007.

Zhang, Yu, First Office Action for CN 2005101381232, Jan. 4, 2008.
Zhang, Yu, First Office Action for CN 2005100487901, Jan. 4, 2008.
IEEE, "IEEE 802.11 1999 (R2003) pp. 401 407", 1999 (revised 2003), 471-474.
IEEE, "IEEE 802.11 1999 (R2003) select pp. 1 to 137", 7.2.3.1, 7.2.3.4, 7.2.3.6, 7.3.1.6, 7.3.2.6, 10.3.1.1, 10.3.2.2, 10.3.6.1, 10.3.7.1, 10.3.10.1. 11.2.1 1999 (Revised 2003), 1-8, 34-58, 98-137.
IEEE, "ISO/IEC 8802.11" (ANSI/IEEE 802.11) Chapter 11, pp. 123-137, 1999.
ETSI, "Broadband Radio Access Networks (BRAN); Hiperlan Type 2; Data Link Control (DLC) Layer; Part 2: Radio Link Control (RLC) sublayer", ETSI TS 101 761-2 V1.3.1, pp. 1-13,92-97, XP002332268 chapter 5.2.6, Jan. 2002.
Arevalo, Joseph, Seventh Office Action for U.S. Appl. No. 11/041,124, Nov. 24, 2009.
Bayaa, Hassan, First Office Action for CA 2,531,395, Jan. 12, 2010.
Li, Yanxin, Second Office Action for CN 200510022900.7, Oct. 16, 2009.
Zhang, Yu, Second Office Action for CN 200510048790.1, Oct. 16, 2009.
Arevalo, Joseph, Ninth Office Action for U.S. Appl. No. 11/041,124, Apr. 15, 2010.
He, Linlin, First Office Action for CN 200810098979.5, Mar. 10, 2010.
Li, Yanhui, Third Office Action for CN 200510022900.7, Feb. 5, 2010.
Bayaa, Hassan, Second Office Action for CA 2,531,395, Jan. 5, 2011.
Li, Yanxin, Rejection Decision for CN 200510022900.7, Aug. 17, 2010.
Arevalo, Joseph, Office Action for U.S. Appl. No. 11/041,124, Aug. 12, 2010.
Mian, Ali, Second Office Action for CA 2,531,384 May 6, 2011.
Arevalo, Joseph, Notice of Allowance for U.S. Appl. No. 11/041,124, Jun. 10, 2011.
Sun, Lili, First Office Action for CN 201010576403.2, Nov. 24, 2011.

* cited by examiner

POWER SAVING VIA VARIABLE LISTEN INTERVALS IN A WLAN

CROSS-REFERENCE TO RELATED APPLICATIONS

This application is a continuation of U.S. patent application Ser. No. 11/041,113 filed Jan. 21, 2005, entitled "Handling Broadcast and Multicast Traffic as Unicast Traffic in a Wireless Network", which is incorporated by reference in its entirety.

FIELD

The invention generally relates to wireless networks. In particular, embodiments of the invention relate to power saving for one or more client devices in a wireless network.

BACKGROUND

A wireless access point (AP) is a device that "connects" wireless devices together to create a wireless network. The wireless devices, also known as "client devices", communicate with each other or with other networks through the AP.

A client device may, or may not, be battery-powered. For example, a client device, such as a wireless-enabled laptop, a wireless-enabled cellphone, a wireless-enabled personal digital assistant (PDA), and the like, may sometimes be battery-powered, and at other times may receive power from an external source, such as a power outlet. Other client devices, such as a desktop computer, may receive power from an external source, such as a power outlet, and may not have the option to be battery-powered.

It may be beneficial to enhance the battery lifetime of battery-powered client devices.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Figure 1:
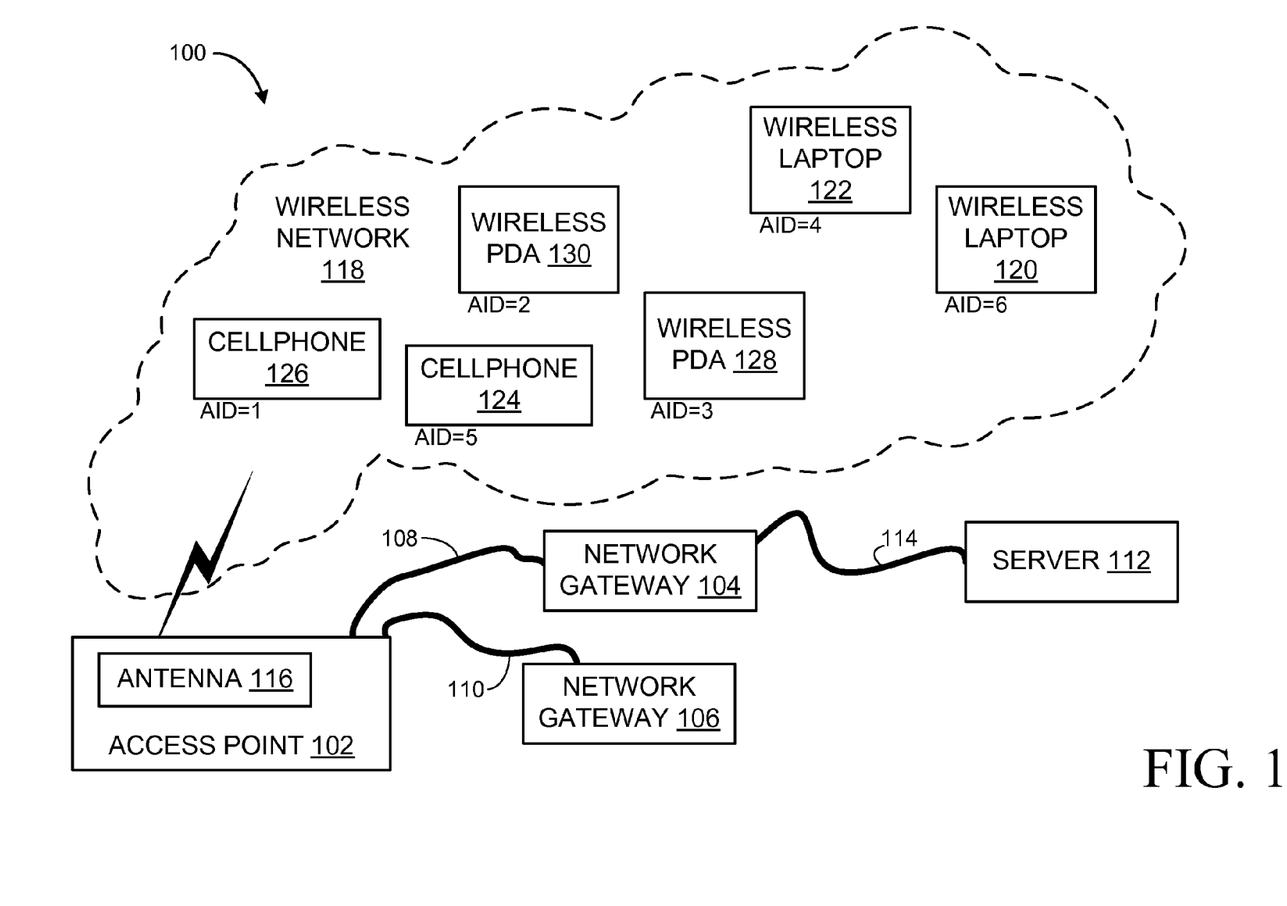
FIG. 1 is an illustration of an exemplary communications system, according to some embodiments of the invention.

FIG. 1 is an illustration of an exemplary communications system 100 according to embodiments of the invention. System 100 includes a wireless access point (AP) 102 and network gateways 104 and 106 coupled to AP 102 via wired connections 108 and 110, respectively. Network gateways 104 and 106, wired connections 108 and 110 may all be part of a "distribution system" for AP 102. Non-limiting examples for network gateways 104 and 106 are cable modems, Asymmetric Digital Subscriber Line (ADSL) modems, Asynchronous Transfer Mode (ATM) network gateways, dial-up modems, satellite modems, Integrated Services Digital Network (ISDN) gateways, T-carrier 1 (T1) modems, and the like. It is obvious that any other configuration of a distribution system for AP 102 is possible. System 100 also includes a desktop computer or server 112 coupled to gateway 104 via a wired connection 114.

AP 102 has at least one antenna 116 and is configurable to support at least one wireless network name, for example, at least one service set identifier (SSID). A non-exhaustive list of examples for antenna 116 includes a dipole antenna, a monopole antenna, a multilayer ceramic antenna, a planar inverted-F antenna, a loop antenna, a shot antenna, a dual antenna, an omnidirectional antenna and any other suitable antenna. AP 102 may include a router.

Exemplary communications system 100 includes wireless-enabled laptops 120 and 122, wireless-enabled cellphones 124 and 126 and wireless-enabled personal digital assistants (PDAs) 128 and 130. Each of wireless-enabled laptops 120 and 122, wireless-enabled cellphones 124 and 126 and wireless-enabled PDAs 128 and 130 is able to execute an initialization process to associate themselves in a wireless network with AP 102.

For example, wireless-enabled laptops 120 and 122, wireless-enabled cellphones 124 and 126 and wireless-enabled PDAs 128 and 130 may become associated with AP 102 over a wireless network 118. Wireless-enabled laptops 120 and 122, cellphones 124 and 126 and PDAs 128 and 130 are referred to as "client devices".

The client devices shown in FIG. 1 are just an example and other suitable client devices and groupings of client devices are also possible. A non-exhaustive list of examples for client devices includes work stations, server computers, notebook computers, laptop computers, desktop personal computers (PCs), personal digital assistant (PDA) computers, hand-held computers, wireless local area network (WLAN) stationary units, WLAN add-on cards, WLAN personal computer memory card international association (PCMCIA) cards, WLAN PC cards, WLAN switches, WLAN routers, WLAN servers, game consoles, digital cameras, digital video cameras, television sets, wireless Internet-Protocol (IP) phones and the like.

In this example, AP 102 and the client devices are all "802.11-enabled", which means that wireless communications therebetween are in accordance with one or more of the following standards defined by the Institute of Electrical and Electronic Engineers (IEEE) for Wireless LAN MAC and Physical layer (PHY) specifications:

| Standard | Published | Maximum Speed | Frequency | Modulation |
|---|---|---|---|---|
| 802.11 | 1997 | 2 Mbps | 2.4 GHz | Phase-Shift |
| 802.11a | 1999 | 54 Mbps | 5.0 GHz | Orthogonal Frequency Division Multiplexing |

-continued

| Standard | Published | Maximum Speed | Frequency | Modulation |
|---|---|---|---|---|
| 802.11b | 1999 | 11 Mbps | 2.4 GHz | Complementary Code Keying |
| 802.11g | 2003 | 54 Mbps | 2.4 GHz | Orthogonal Frequency Division Multiplexing |

However, it will be obvious to those of ordinary skill in the art how to modify the following for other existing WLAN standards or future related standards, including 802.11n.

The 1999 edition of the 802.11 standard (as reaffirmed Jun. 12, 2003) distinguishes between infrastructure WLANs and ad-hoc WLANs. The following description is for infrastructure WLANs, involving the use of access points.

The 802.11 standard explains that access points transmit beacon frames at substantially regular time periods to announce the existence of and to synchronize wireless networks. The number of time units between target beacon transmission times is referred to as a "beacon interval". The format of beacon frames and their contents is explained in detail in the 802.11 standard. The beacon interval is included in each beacon frame.

Each beacon frame also includes a timestamp which is the value of a clock internal to the access point at the actual transmission time of the beacon. Due to use of carrier sense multiple access/collision detection (CSMA/CD) techniques, the actual transmission time may be later than the target beacon transmission time. Consequently, the timestamp field of the beacon frame is not filled until the actual transmission occurs. A client device receiving the beacon frame will update its internal clock according to the timestamp in the received beacon frame.

Each beacon frame also includes a Traffic Indication Map (TIM) that identifies client devices for which unicast traffic is pending and buffered in the access point. This information is encoded in a partial virtual bitmap. The TIM also includes an indication whether broadcast or multicast traffic is pending.

There are two different TIM types: TIM and delivery TIM (DTIM). A TIM includes a "DTIM count" field that indicates how many beacon frames (including the current frame) appear before the next DTIM. A DTIM count of zero indicates that the current TIM is a DTIM. The "DTIM period" field indicates the number of beacon intervals between successive DTIMs. Every DTIM period, a TIM of type "DTIM" is transmitted within a beacon, rather than an ordinary TIM. After a DTIM, the access point sends out the buffered broadcast or multicast traffic using normal frame transmission rules, before transmitting any unicast frames.

A client device may be in one of two different power states: "Awake"—the client device is fully powered; and "Doze"—the client device is unable to transmit or receive and consumes very low power. The manner in which a client device transitions between these two power states is determined by the power management mode of the client device. In "Active mode", the client device may receive frames at any time and is in the "Awake" state. In "Power Save mode", the client device listens to selected beacon frames (based upon the client device's "Listen Interval" parameter) and sends "Power Save poll (PS-poll)" frames to the access point if the TIM element in the most recent beacon frame indicates buffered unicast traffic for that client device.

In Power Save mode, a client device is in the Doze state and enters the Awake state to receive selected beacons, to receive broadcast and multicast transmissions following certain received beacons, to transmit, and to await responses to transmitted PS-poll frames or (for CF-pollable client devices) to receive contention-free transmissions of buffered traffic.

An access point maintains a Power Management status for each currently associated client device that indicates in which Power Management mode the client device is currently operating. Depending on the Power Management mode of the station, the access point temporarily buffers traffic destined for the client device. The access point transmits buffered unicast traffic to a client device in Power Save mode only in response to a PS-poll from that client device or during the contention-free (CF) period in the case of a CF-pollable client device in Power Save mode.

The "Listen Interval" parameter of a client device specifies the maximum number of beacon intervals that may pass before the client device awakens and listens for the next beacon frame. The client device informs the access point of its "Listen Interval" parameter during the association with the access point. The parameter may be determined, for example, by the desired power consumption/performance target of the client device.

The access point has an aging function to delete buffered traffic when it has been buffered for an excessive period of time. The aging function is based on the "Listen Interval" parameter, so that buffered traffic is retained for a period that is at least as long as a product of the Beacon Interval and the "Listen Interval" parameter of the client device for which the traffic is buffered.

The client device also has a Boolean parameter, entitled "Receive DTIMs", which is set when the client device informs the access point of a change in the power management mode of the client device. When the "Receive DTIMs" parameter is true, the client device awakens to receive all beacon frames that include a DTIM. When the parameter is false, the client device is not required to awaken for every beacon frame that includes a DTIM.

More detail about the power-management operation of the access point and client devices during the contention period and the contention-free period is given in the section of the 802.11 standard entitled "Power management in an infrastructure network".

The "Listen Interval" parameter of a particular client device affects the particular client device's power save behavior regarding unicast traffic, and the "DTIM period" of the access point and the "Receive DTIMs" parameter of the client devices affect the power save behavior of all client devices in the wireless network regarding broadcast and multicast traffic.

Client devices in a wireless network may have conflicting requirements for power consumption and communication throughput when in Power Save mode. Moreover, the need for power saving in a battery-powered client device may increase over time as the battery drains, overriding communication throughput considerations for the battery-powered client device.

Currently, an access point is able to store only a single DTIM period. Consequently, different client devices in Power Save mode will all wake up for the same beacon frames according to the single DTIM period. Currently, a network manager may need to balance the conflicting requirements for power consumption and communication throughput when in Power Save mode of client devices in a wireless network when configuring the DTIM period of an access point.

Currently, a client device that has its "Receive DTIMs" parameter set to true and is in Power Save mode will awaken according to the DTIM period of the access point with which it is associated in order to listen to DTIMs and determine whether to stay awake to receive broadcast or multicast traffic. That same client device will also awaken within a period determined by its "Listen Interval" parameter to listen to TIMs and determine whether to stay awake to issue a PS-poll frame for buffered unicast traffic.

Each client device has a unique hardware address, for example a medium access control (MAC) address, and is assigned an Internet Protocol (IP) address by a dynamic host configuration protocol (DHCP) server, which may be embedded in the access point. Alternatively, the IP address of a client device may be statically configured. In addition, an access point assigns an "association identifier (AID)" to client devices associated therewith and maintains a mapping of AIDs to MAC addresses. The access point identifies those client devices for which it has buffered unicast traffic by setting bits in the TIM's partial virtual bitmap that correspond to the appropriate AIDs. Moreover, the access point maintains an Address Resolution Protocol (ARP) table that contains a mapping of Internet Protocol (IP) addresses to MAC addresses.

A network gateway may receive from an external network one or more information frames to forward to a network device associated with a particular IP address. The network gateway may have to resolve the MAC address of the network device associated with the particular IP address in order to include the MAC address in the information frames and to send the information frames to the network device. The network gateway may generate an ARP request and send it to the various network devices, including the access point, which will treat it as broadcast traffic. The network device (or client device associated with the access point) having the particular IP address may respond to the ARP request with its MAC address.

According to an embodiment of the invention, AP 102 may handle received broadcast or multicast traffic as multiple instances of unicast traffic, where each instance is destined for a corresponding client device associated with AP 102. AP 102 will indicate in a TIM the existence of each instance that is destined for a client device in Power Save mode. This indication will be repeated in subsequent TIMs until the aging function of AP 102 has caused the instance to be discarded or until the client device has issued a PS-poll frame or has received the instance in a contention-free transmission of buffered traffic, whichever comes first.

AP 102 will no longer indicate in a DTIM the existence of the broadcast or multicast traffic and will no longer transmit the broadcast or multicast traffic following a DTIM. Consequently, this embodiment will affect all client devices associated with AP 102. Alternatively, AP 102 will continue to indicate in a DTIM the existence of the broadcast or multicast traffic and to transmit the broadcast or multicast traffic following the DTIM, in addition to the transmission of the broadcast or multicast traffic as multiple instances of unicast traffic. In this alternative embodiment, only those client devices having a "Receive DTIMs" parameter set to false will be affected.

Figure 2:
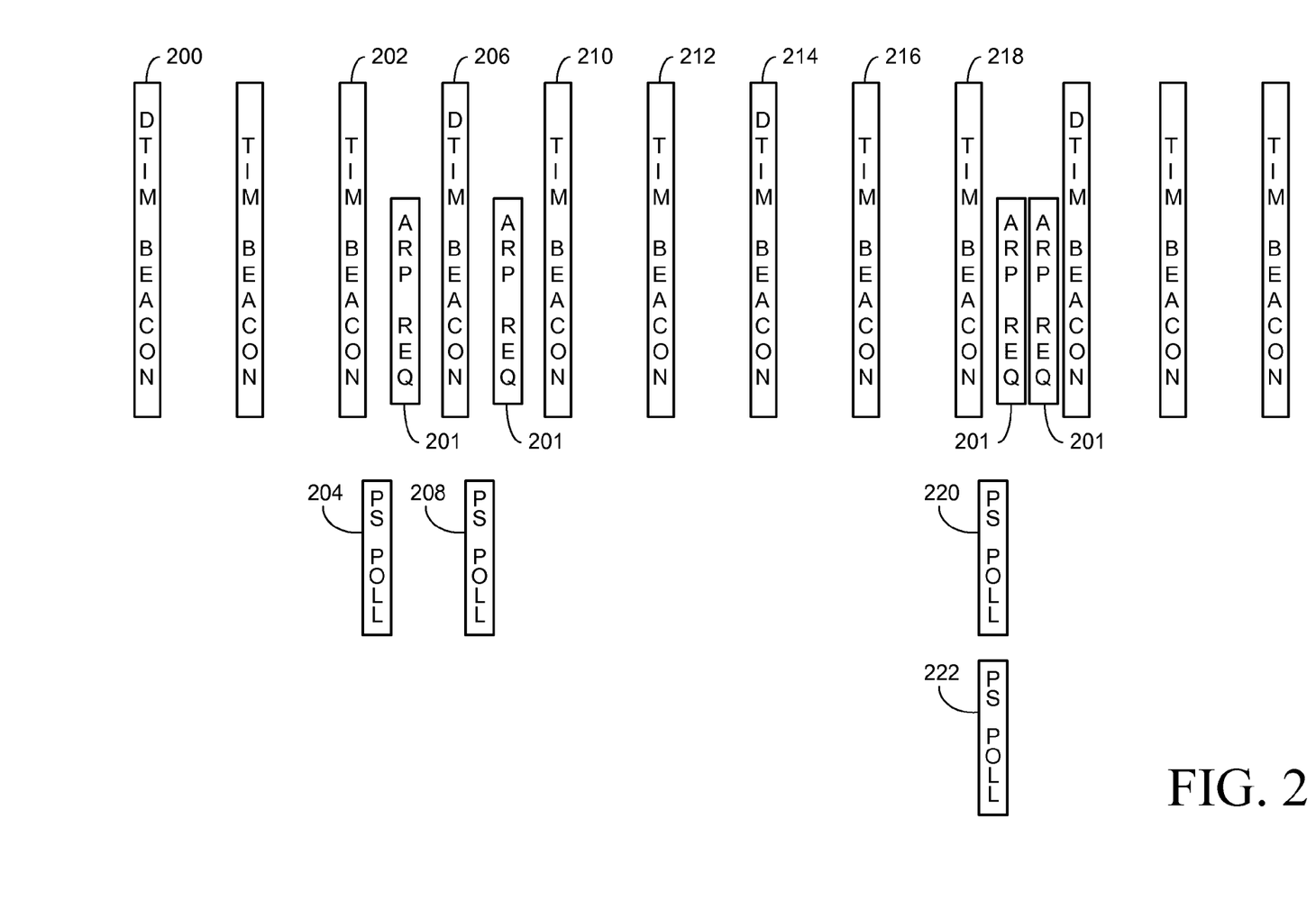
FIG. 2 is an illustration of an exemplary sequence of beacon frames, helpful in understanding some embodiments of the invention.

FIG. 2 is an illustration of an exemplary sequence of beacon frames transmitted by AP 102, according to some embodiments of the invention. Each beacon frame 200 includes a TIM, and if, for example, the DTIM period of AP 102 is 3, then in every third beacon frame, the TIM is a DTIM.

For example, laptop 122, cellphone 126 and PDAs 128 and 130 may be in Power Save mode, with "Listen Interval" parameters of 4, 8, 8 and 6, respectively.

For example, if AP 102 receives an ARP request 201 prior to beacon frame 202, AP 102 will handle the broadcast traffic as multiple instances of unicast traffic, where each instance is destined for a corresponding wireless client device associated with AP 102. Since laptop 120 and cellphone 124 are in Active mode, AP 102 will transmit ARP request 201 to laptop 120 and cellphone 124 as soon as possible. AP 102 will buffer ARP request 201 for each of the client devices in Power Save mode.

AP 102 will then include in TIMs of subsequent beacon frames indications of this buffered "unicast" data. For example, AP 102 will include in the TIM of beacon frame 202 indications that unicast data is buffered for laptop 122, cellphone 126 and PDAs 128 and 130. Laptop 122 may awaken from Power Save mode to listen to the TIM of beacon frame 202, may identify that unicast data is buffered, and may send a PS-poll frame 204 to AP 102 in response. AP 102 may then transmit ARP request 201 to laptop 122.

AP 102 will then include in the TIM of beacon frame 206 indications that unicast data is buffered for cellphone 126 and PDAs 128 and 130. PDA 130 may awaken from Power Save mode to listen to the TIM of beacon frame 206, may identify that unicast data is buffered, and may send a PS-poll frame 208 to AP 102 in response. AP 102 may then transmit ARP request 201 to PDA 130.

AP 102 will then include in the TIMs of beacon frames 210, 212, 214, 216 and 218 indications that unicast data is buffered for cellphone 126 and PDA 128. Cellphone 126 and PDA 128 may awaken from Power Save mode to listen to the TIM of beacon frame 218, may identify that unicast data is buffered, and may send PS-poll frames 220 and 222, respectively, to AP 102 in response. AP 102 may then transmit ARP request 201 to cellphone 126, followed by a transmission of ARP request 201 to PDA 128.

Figure 3:
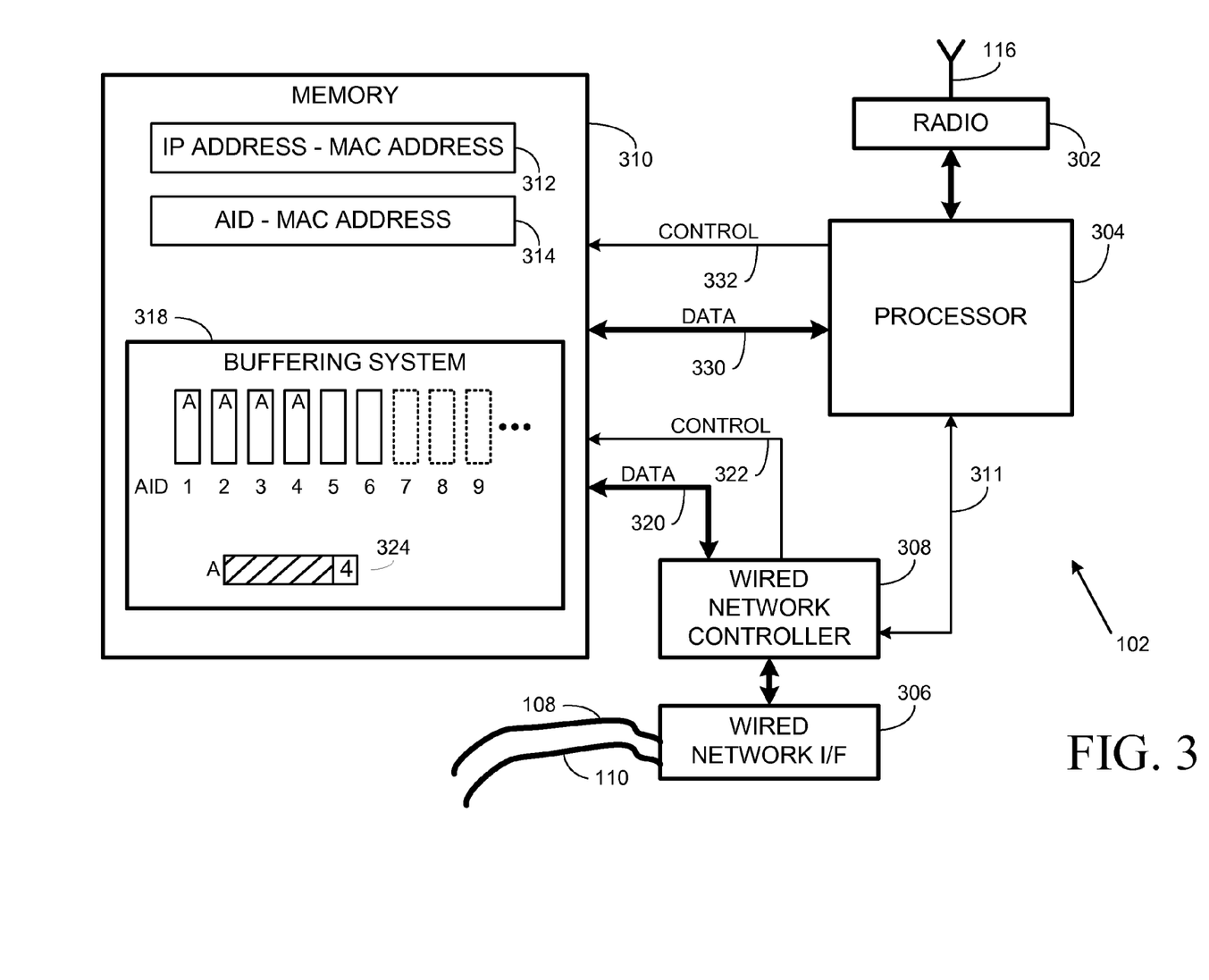
FIG. 3 is a block diagram of an exemplary access point, according to an embodiment of the invention.

FIG. 3 is a block diagram of an exemplary access point, according to some embodiments of the invention. AP 102 includes at least one antenna 116 coupled to a radio 302, which in turn is coupled to a processor 304 having baseband functionality. A non-exhaustive list of examples for processor 304 includes a central processing unit (CPU), a microcontroller, a digital signal processor (DSP), a reduced instruction set computer (RISC), a complex instruction set computer (CISC) and the like. Furthermore, processor 304 may be part of an application specific integrated circuit (ASIC) or may be a part of an application specific standard product (ASSP).

AP 102 also includes a wired network interface 306 coupled to a wired network controller 308. The wired network(s) may be, for example, Ethernet network(s), token rings, Universal Serial Bus (USB), wired network(s) according to the IEEE 1394-1995, IEEE 1394a-2000, and IEEE 1394b standards (commonly known as "FireWire"), or any combination thereof. Wired network interface 306 is able to use wired connections 108 and 110.

Radio 302 and processor 304 may be part of the same integrated circuit or in separate integrated circuits. Similarly, processor 304 and wired network controller 308 may be part of the same integrated circuit or in separate integrated circuits.

AP 102 also includes a memory 310, which may be fixed in or removable from AP 102. Memory 310 may be coupled to processor 304 or partly embedded in processor 304. A non-exhaustive list of examples for memory 310 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

Processor 304 and wired network controller 308 may be coupled by signals 311 to coordinate their activities, for example access to memory 310.

Memory 310 may store mappings 312 of MAC addresses of client devices associated with AP 102 to respective IP addresses, and mappings 314 of MAC addresses of client devices associated with AP 102 to respective AIDs. Alternatively, any or all of these mappings may be stored internally in processor 304. For example, cellphone 126 may have AID=1, PDA 130 may have AID=2, PDA 128 may have AID=3, laptop 122 may have AID=4, cellphone 124 may have AID=5, and laptop 120 may have AID=6.

Memory 310 may also include a buffering system 318 to store incoming traffic destined for client devices. For example, data 320 of incoming traffic may be transferred to buffering system 318 under control signals 322 of wired network controller 308.

Buffering system 318 already includes buffers to store unicast traffic on a per-client device basis.

In one embodiment, AP 102 will simply copy the received broadcast or multicast traffic to the buffers of each of the client devices which are to receive the traffic.

In another embodiment, AP 102 may maintain lists for each associated client device (indexed, for example, by the AID). AP 102 may allocate a buffer upon receipt of broadcast or multicast data and may include a pointer to the allocated buffer (or any other suitable indication of the allocated buffer) in the list for each client device in Power Save mode that is destined to receive the data. Each such allocated buffer is associated with a counter that is set to the total number of client devices in Power Save mode that are destined to receive the broadcast or multicast data. Each time the buffered data is sent to one of the client devices, the counter is decremented. Once the counter is zero, AP 102 is free to deallocate the allocated buffer and discard the buffered data.

For example, as AP 102 receives ARP request 201 prior to beacon frame 202 (FIG. 2), AP 102 may allocate buffer A to store ARP request 201. AP 102 may set a counter 324 associated with buffer A to the value 4, which is the total number of client devices that are currently in Power Save mode. AP 102 will include a pointer to buffer A (or any other suitable indication of buffer A) in the lists for AID 1, 2, 3 and 4 (corresponding to cellphone 126, PDA 130, PDA 128 and laptop 122, respectively, all of which are in Power Save mode).

Once AP 102 has transmitted ARP request 201 to laptop 122 (following the PS-poll frame sent by laptop 122 in response to beacon frame 202), the pointer to buffer A is removed from the list for AID 4, and counter 324 is decremented by 1.

Once AP 102 has transmitted ARP request 201 to PDA 130 (following the PS-poll frame sent by PDA 130 in response to beacon frame 206), the pointer to buffer A is removed from the list for AID 2, and counter 324 is decremented by 1.

Once AP 102 has transmitted ARP request 201 to cellphone 126 (following the PS-poll frame sent by cellphone 126 in response to beacon frame 218) and to PDA 128 (following the PS-poll frame sent by PDA 128 in response to beacon frame 218), the pointer to buffer A is removed from the lists for AID 1 and 3, and counter 324 is decremented by 2.

Processor 304 may handle the received broadcast or multicast traffic as multiple instances of unicast traffic, where each of the instances is destined for a corresponding wireless client device associated with AP 102, by accessing buffering system 318 through data signals 330 and control signals 332.

Figure 4:
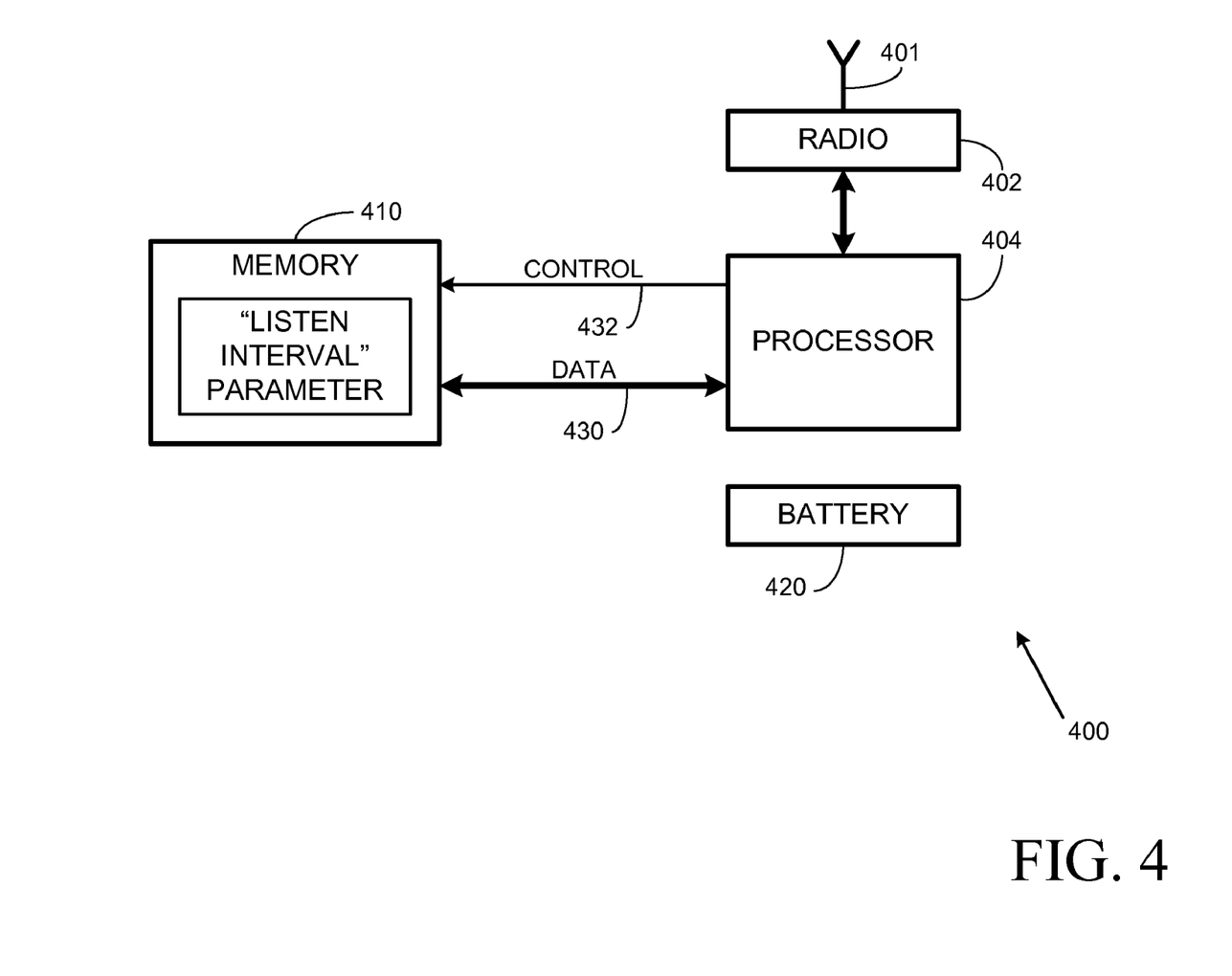
FIG. 4 is a block diagram of an exemplary wireless client device, according to an embodiment of the invention.

FIG. 4 is a block diagram of an exemplary client device, according to some embodiments of the invention. A wireless client device 400 includes at least one antenna 401 coupled to a radio 402, which in turn is coupled to a processor 404 having baseband functionality. A non-exhaustive list of examples for processor 404 includes a central processing unit (CPU), a digital signal processor (DSP), a reduced instruction set computer (RISC), a complex instruction set computer (CISC) and the like. Furthermore, processor 404 may be part of an application specific integrated circuit (ASIC) or may be a part of an application specific standard product (ASSP). Radio 402 and processor 404 may be part of the same integrated circuit in separate integrated circuits.

Client device 400 also includes a memory 410, which may be fixed in or removable from client device 400. Memory 410 may be coupled to processor 404 or partly embedded in processor 404. A non-exhaustive list of examples for memory 410 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

Processor 404 may access data stored in memory 410 through data signals 430 and control signals 432. Memory 410 may store an indication of its "Listen Interval" parameter. Memory 410 may store a default hard-coded value for the "Listen Interval" parameter. The "Listen Interval" parameter may be configurable by a user of client device 400.

Processor 404 may adjust the "Listen Interval" parameter according to predefined considerations. A non-exhaustive list of examples for such considerations includes:

a) a charge level of a battery 420 to power the client device (for example, increasing the preferred DTIM period as the charge level drops):

b) an expected usage model for the client device; and c) network parameters (for example, does the gateway remember the IP address—MAC address mapping after receiving a response to an ARP request?).

Processor 404 may initiate a reassociation request to declare this adjusted "Listen Interval" parameter to AP 102.

If a client device sets its "Receive DTIMs" parameter to False, then in Power Save mode, the client device will not wake up for DTIMs according to the DTIM period, yet will awaken to listen to TIMs within a period defined by the product of its "Listen Interval" and the beacon interval. If the client device has a "Listen Interval" parameter that is greater than the DTIM period of AP 102, then in this embodiment of the invention, the client device will increase its power-saving potential while retaining the ability to receive broadcast and multicast traffic. This increase in power-saving potential is in comparison to a client device having its "Receive DTIMs" parameter set to True and that is associated with an access point that buffers broadcast or multicast traffic for clients in Power Save mode, indicates the existence of the buffered broadcast or multicast traffic in a DTIM and transmits the buffered broadcast or multicast traffic following the DTIM and that does not handle the broadcast or multicast traffic as multiple instances of unicast traffic.

In order to make use of some embodiments of the invention, a client device may recognize that an access point with which the device is associated handles received broadcast and multicast traffic as multiple instances of unicast traffic, where the instances are destined for corresponding wireless client devices associated with the access point. The client device may set its "Receive DTIMs" parameter to false when entering Power Save mode.

The client device may configured manually or automatically to use this behavior. For example, manual configuration may be achieved through an option screen or configuration file of the client device or the like. Automatic configuration may be achieved by pushing the appropriate configuration to the client device, for example, by over-the-air policy management or by connecting the client device to a computer and loading the configuration information via the connection. Automatic configuration may be achieved through communication with the access point. For example, the client device could wait for an ARP to be sent either as a unicast message or as a broadcast message, and then configure its "Receive DTIMs" parameter appropriately on the assumption that the access point will continue to transmit broadcast traffic in the same manner. In another example, the access point could send a particular flag in one of the downlink frames to indicate that it intends to pursue this broadcast-free connection mode. In yet another example, the client device could query the access point regarding its handling of broadcast and multicast traffic.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method of increasing a power saving potential of a wireless client device that is associated with an access point in an association having a value for a listen interval parameter, the method comprising:
   determining, according to predefined considerations, a different value for said listen interval parameter; and
   declaring said different value for said listen interval parameter in a wireless transmission to said access point,
   wherein said listen interval parameter specifies a number of beacon intervals that can pass from a time said wireless client device listens for a beacon frame from said access point before said wireless client device listens for a next beacon frame from said access point, and
   wherein said predefined considerations comprise an expected usage model for said wireless client device.

2. The method of claim 1, wherein declaring said different value comprises:
   initiating a reassociation request to declare said different value for said listen interval parameter to said access point.

3. The method of claim 1, wherein said predefined considerations comprise a charge level of a battery to power said wireless client device.

4. A wireless client device comprising:
   a memory to store a value of a listen interval parameter that specifies a number of beacon intervals that can pass from a time said wireless client device listens for a beacon frame from an access point before said wireless client device listens for a next beacon frame from said access point;
   a radio through which said device is associated with said access point in an association having said value for said listen interval parameter; and
   a processor to determine, according to predefined considerations, a different value for said listen interval parameter and to declare said different value for said listen interval parameter to said access point via said radio,
   wherein said predefined considerations comprise an expected usage model for said wireless client device.

5. The wireless client device of claim 4, wherein the processor is arranged to initiate a reassociation request to declare said different value for said listen interval parameter to said access point.

6. The wireless client device of claim 4, wherein said predefined considerations comprise a charge level of a battery to power said wireless client device.

7. The wireless client device of claim 4, wherein said access point uses an IEEE 802.11 wireless local area network standard.

8. A wireless communications system comprising:
   an access point; and
   a wireless client device comprising:
      a memory to store a value of a listen interval parameter that specifies a number of beacon intervals that can pass from a time said wireless client device listens for a beacon frame from said access point before said wireless client device listens for a next beacon frame from said access point;
      a radio through which said device is associated with said access point in an association having said value for said listen interval parameter; and
      a processor to determine, according to predefined considerations, a different value for said listen interval parameter and to declare said different value for said listen interval parameter to said access point via said radio,
   wherein said predefined considerations comprise an expected usage model for said wireless client device.

9. The wireless communications system of claim 8, wherein the processor is arranged to initiate a re-association request to declare said different value for said listen interval parameter to said access point.

10. The wireless communications system of claim 8, wherein said predefined considerations comprise a charge level of a battery to power said wireless client device.

11. The wireless communications system of claim 8, wherein said access point uses an IEEE 802.11 wireless local area network standard.

12. A non-transitory memory comprising computer code, which when executed by a processor of a wireless client device that is associated with an access point in an association having a value for a listen interval parameter, results in the wireless client device:
   determining, according to predefined considerations, a different value for said listen interval parameter; and
   declaring said different value for said listen interval parameter in a wireless transmission to said access point,
   wherein said listen interval parameter specifies a number of beacon intervals that can pass from a time said wireless client device listens for a beacon frame from said access point before said wireless client device listens for a next beacon frame from said access point,
   wherein said predefined considerations comprise an expected usage model for said wireless client device.

13. The memory of claim 12, wherein said predefined considerations comprise a charge level of a battery to power said wireless client device.

* * * * *